(12) United States Patent
Bojiuc

(10) Patent No.: US 8,159,104 B1
(45) Date of Patent: Apr. 17, 2012

(54) DC INDUCTION ELECTRIC MOTOR-GENERATOR WITH MAGNETIC GAP SELF COMMUTATING LAMINATED FERROMAGNETIC ROTATING CORE

(75) Inventor: Dumitru Bojiuc, Marina Del Rey, CA (US)

(73) Assignee: Clearwater Holdings, Ltd, Marina Del Rey, CA (US)

( * ) Notice: Subject to any disclaimer, the term of this patent is extended or adjusted under 35 U.S.C. 154(b) by 0 days.

(21) Appl. No.: 12/876,744

(22) Filed: Sep. 7, 2010

Related U.S. Application Data

(63) Continuation-in-part of application No. 11/209,525, filed on Aug. 22, 2005, now Pat. No. 7,791,242.

(51) Int. Cl.
*H02K 21/26* (2006.01)
(52) U.S. Cl. ............... 310/181; 310/154.02; 310/266
(58) Field of Classification Search ............ 310/266, 310/112–114, 181, 156.35, 154.02, 154.08, 310/154.04, 154.34, 154.42
See application file for complete search history.

(56) References Cited

U.S. PATENT DOCUMENTS

| | | | | |
|---|---|---|---|---|
| 3,894,252 A | * | 7/1975 | Miwa et al. | 310/51 |
| 4,237,394 A | * | 12/1980 | Aoki | 310/113 |
| 7,230,363 B2 | * | 6/2007 | Stout et al. | 310/266 |

* cited by examiner

*Primary Examiner* — Dang Le
(74) *Attorney, Agent, or Firm* — Patent Law & Venture Group; Gene Scott

(57) ABSTRACT

A motor-generator apparatus has a stator and a rotor in a cylindrical arrangement about a central longitudinal axis. The stator has a static circular magnetic surface spaced apart from, a static circular electromagnetic surface. The rotor has a cylindrical arrangement of radially oriented laminations positioned proximal to, and between the static circular magnetic, and the static circular electromagnetic surfaces. The rotor is supported for rotation relative to the stator. A circular arrangement of electromagnets are electrically interconnected for carrying an electrical current for energizing the circular electromagnetic surface which is discontinuous with a plurality of portions gapped apart.

5 Claims, 6 Drawing Sheets

DC INDUCTION ELECTRIC MOTOR-GENERATOR WITH MAGNETIC GAP SELF COMMUTATING LAMINATED FERROMAGNETIC ROTATING CORE

CROSS-REFERENCE TO RELATED APPLICATIONS

This is a Continuation-In-Part application of U.S. patent application Ser. No. 11/209,525, filed Aug. 22, 2005, now U.S. Pat. No. 7,791,242, issued on the filing date of this application, and which provides a legal priority date of this application and which is incorporated herein by reference.

DESCRIPTION OF THE DRAWINGS

Like reference symbols in the various drawings indicate like elements.

DETAILED DESCRIPTION

An electromagnetic motor-generator apparatus 10 may have a stator 12 and a rotor 14 both of which may have an elongated circular toroidal shape symmetrical about a longitudinal axis 5 and which are concentrically arranged. The stator 12 may comprise an outer portion 12A and a mutually concentric inner portion 12B spaced apart from the outer portion 12A. In the space between the outer 12A and inner 12B stator portions the rotor 14, as said, may be positioned and arranged mutually concentric with both the outer 12A and the inner 12B portions of the stator 12.

Figure 1:
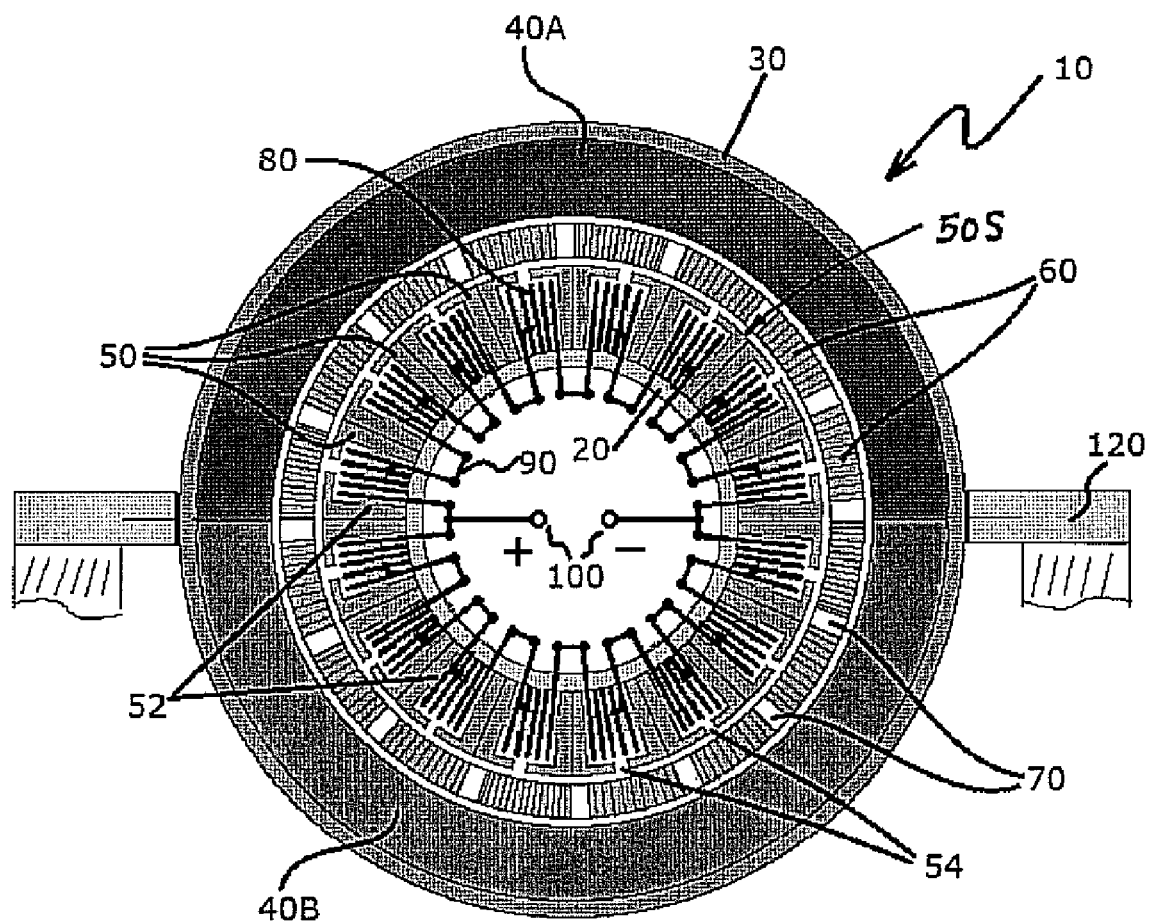
FIG. 1 is an axially oriented vertical cross-section of an example of an embodiment of the apparatus herein described.

In one embodiment, the outer stator portion 12A may comprise a pair of opposing permanent magnets 40A and 40B as shown in FIG. 1. The upper magnet 40A in this figure may preset a north pole face to the interior of apparatus 10, while the lower magnet 40B may preset a south pole face to the interior of apparatus 10. The concave surfaces of the magnets 40A and 40B are the pole surfaces of interest. In this embodiment, the inner stator portion 12B may comprise a circumferentially arranged set of coil forms 50 of magnetically permeable material, each having a coil core 52 formed as an integral part of the coil form 50. Coils 80 may be wound on the coil cores 52 and the ends of the coils 80 may be brought radially into the interior of the inner stator portion 12B where the coils 80 may be interconnected in serial, parallel or other combination of electrical interconnection as for example as shown in FIG. 1 or otherwise. It is pointed out that the coil forms 50 comprise a left side and a right side which are gapped apart with the coil core 52 interconnecting the left and right sides. The rotor 14 may comprise sets of radially oriented laminations 60 separated by insulation sheets 62. The magnets 40A and 40B, laminations 60, insulation sheets 62, coil forms 50, and coils 80, all extend axially to an extent defining the axial length of the apparatus 10. The exterior of the apparatus 10 is defined by a tubular structure 30 and the interior of the apparatus 10 may be defined by an inner tubular structure 20. The components of the apparatus, as described above, are held in the space defined between the inner tubular structure 20 and the outer tubular structure 30.

Operation:

Referring again to FIG. 1 the north pole face of the upper magnet 40A induces a south pole face along the top edge of the laminations 60 which are adjacent to the north pole face of upper magnet 40A. This induces a south pole face along the bottom edge of each of those same laminations 60. Since the laminations 60 are included as part of the rotor 14, they are exposed to the north pole face of magnet 40A during one-half of their full rotation, and are exposed to the south pole face of magnet 40B during the other-half of their full rotation.

Coils 80 are all interconnected in series electrical interconnection as shown. When energized with a DC voltage at terminals 100, electrical current flows clockwise through the coils 80 in the upper half of the apparatus 10 and counterclockwise through the coils 80 in the lower half of apparatus 10. When energized, each coil 80 produces a magnetic flux directed along the coil core 52 and forces the coil frame 50 into a magnetically polarized condition. The coil frames 50 therefore take on a magnetic north polarization at one end of each coil frame 50 and a magnetic south polarization at the opposite end of each coil frame 50. It is noted that the coil frames 50 opposite the north magnetic pole of permanent magnet 40A may have a N-S, N-S . . . N-S orientation moving around the frames 50 in a clockwise direction from 9 o'clock to 3 o'clock in the diagram of FIG. 1. Also, the coil frames 50 opposite the south magnetic pole of permanent magnet 40B may have a S-N, S-N . . . S-N orientation moving around the frames 50 in a clockwise direction from 3 o'clock to 9 o'clock in the diagram of FIG. 1. At 9 o'clock both abutting frames 50 are polarized as north magnetic poles, and at 3 o'clock both abutting frames 50 are polarized as south magnetic poles.

When energized, the north magnetic pole edges of the laminations are magnetically attracted to the south pole portions of the frames 50 and repelled by the north pole portions of the frames 50, and the south magnetic pole edges of the laminations are magnetically attracted to the north magnetic pole portions of the frames 50 and repelled by the south magnetic pole portions, thereby producing rotational forces on rotor 14.

When functioning as a motor, an electrical voltage is applied to terminals 100 and the rotor 14 is engaged with any device that requires or is able to use rotational force such as a rotary pump or the drive wheels of a vehicle. When functioning as a generator, the rotor 14 is caused to rotate by an outside rotational force whereupon a voltage is delivered to terminals 100 due to the rotor's motion.

Figure 2:
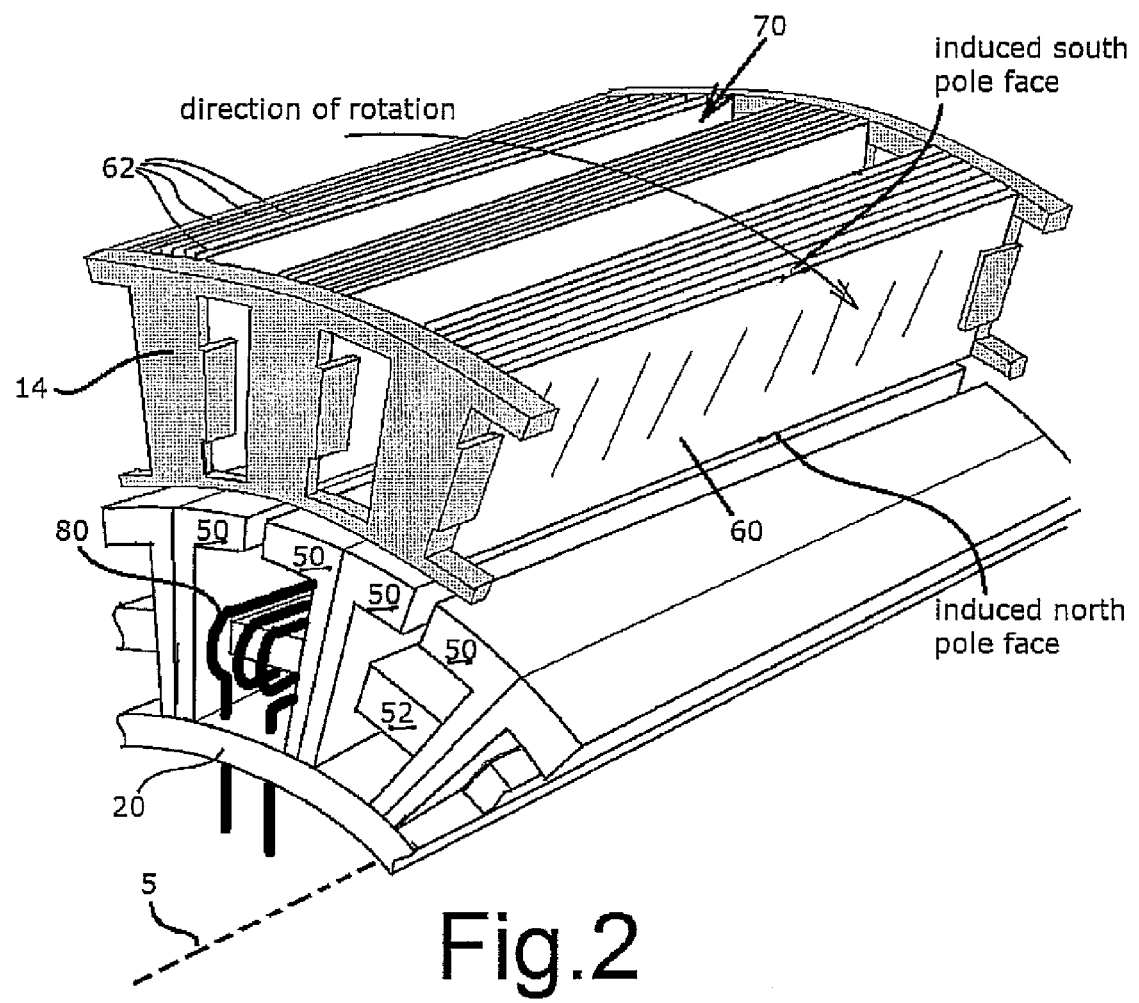
FIG. 2 is a perspective view of a portion of the apparatus shown in FIG. 1.
Figure 3:
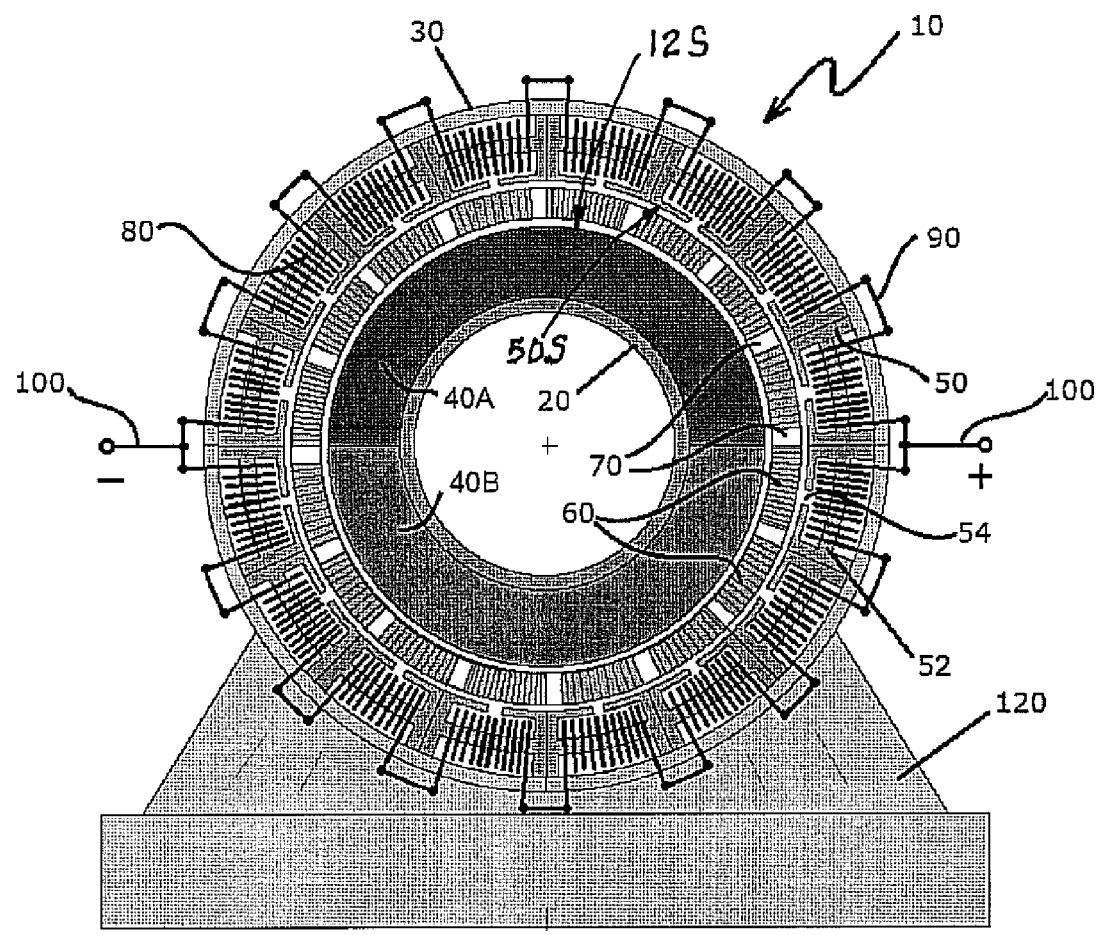
FIG. 3 is an axially oriented vertical cross-sectional view of an example of a further embodiment of the apparatus herein described.
Figure 4:
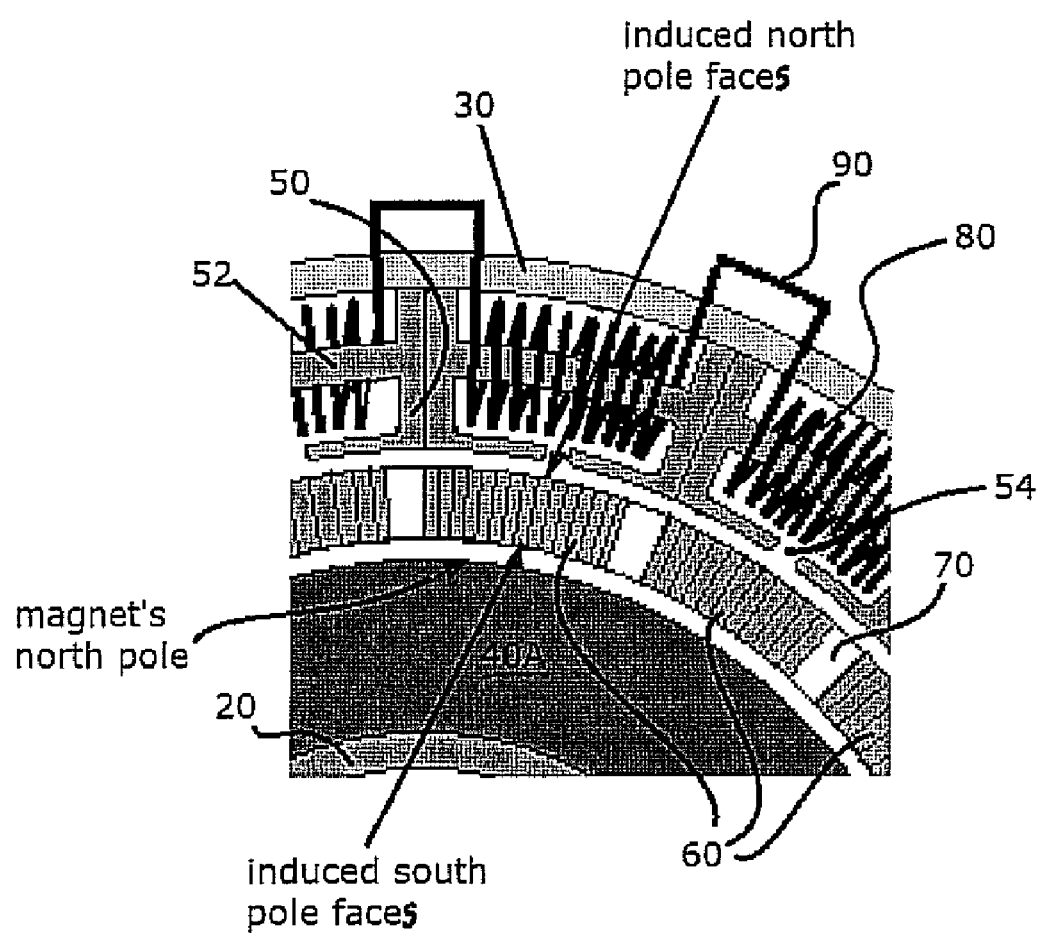
FIG. 4 is an enlarged view of a portion of FIG. 3.

In another embodiment, the inner stator portion 12A may comprise a pair of opposing permanent magnets 40A and 40B as shown in FIG. 3. The upper magnet 40A in this figure may preset a north pole face to the exterior of apparatus 10, while the lower magnet 40B may preset a south pole face to the exterior of apparatus 10. The convex surfaces of the magnets 40A and 40B are the pole surfaces of interest. In this embodiment, the outer stator portion 12B may comprise a circumferentially arranged set of coil forms 50 of magnetically permeable material, each having a coil core 52 formed as an integral part of the coil form 50. Coils 80 may be wound on the coil cores 52 and the ends of the coils 80 may be brought radially into the exterior of the outer stator portion 12B where the coils 80 may be interconnected in serial, parallel or other combination of electrical interconnection as for example as shown in FIG. 3 or otherwise. It is pointed out that the coil forms 50 comprise a left side and a right side which are gapped apart with the coil core 52 interconnecting the left and right sides. The rotor 14 may comprise sets of radially oriented laminations 60 separated by insulation sheets 62 and spaced apart as shown in FIG. 2 with magnetic gap 70. The magnets 40A and 40B, laminations 60, insulation sheets 62, coil forms 50, and coils 80, all extend axially to an extent defining the axial length of the apparatus 10. The exterior of the apparatus 10 is defined by a tubular structure 30 and the interior of the apparatus 10 may be defined by an inner tubular structure 20. The components of the apparatus, as described above, are held in the space defined between the inner tubular structure 20 and the outer tubular structure 30.

As can be seen, the operation of the further embodiment described above is identical to that of the first described embodiment.

Figure 5:
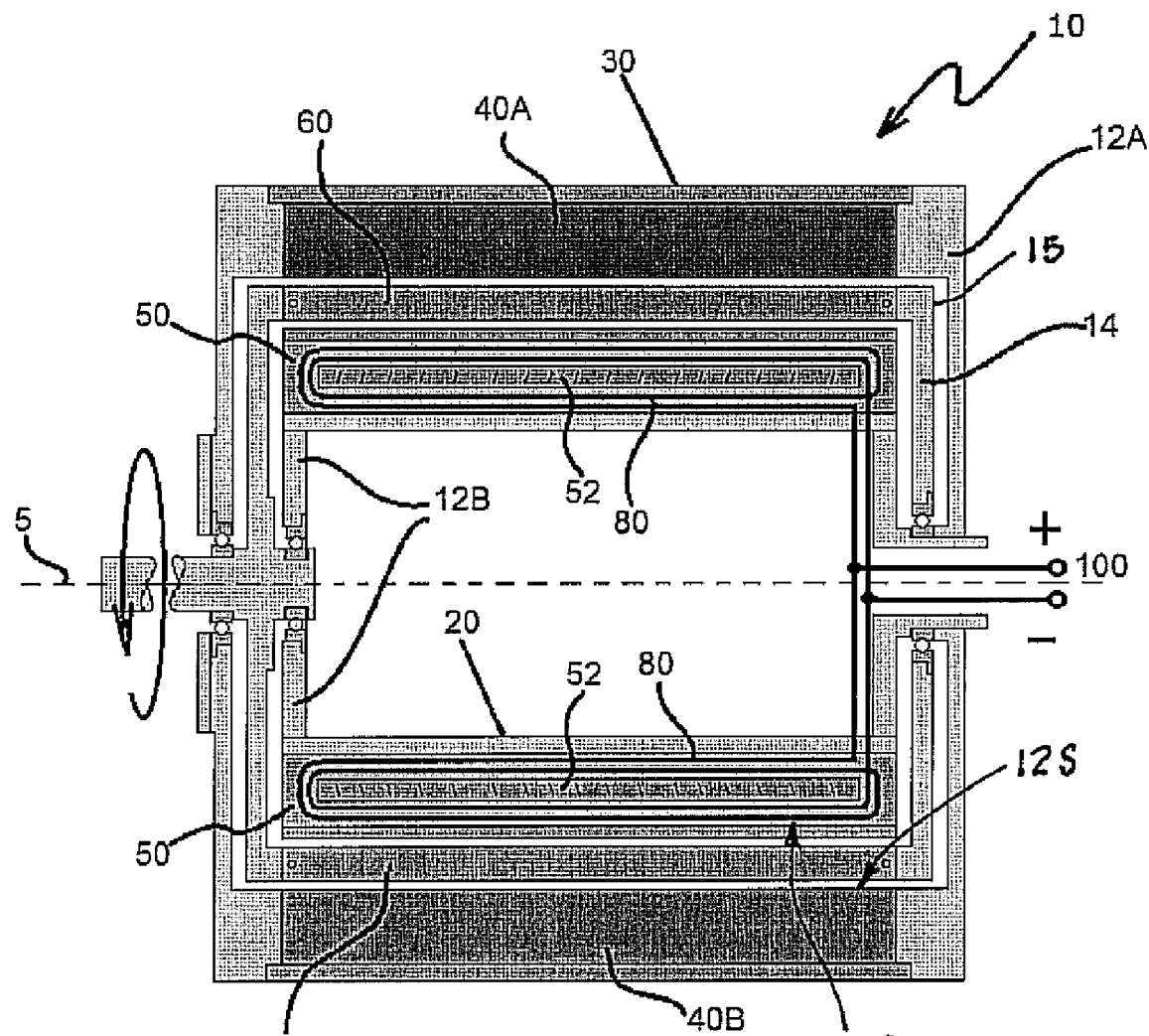
FIG. 5 is a side view vertical cross section of the apparatus of FIG. 1.
Figure 6:
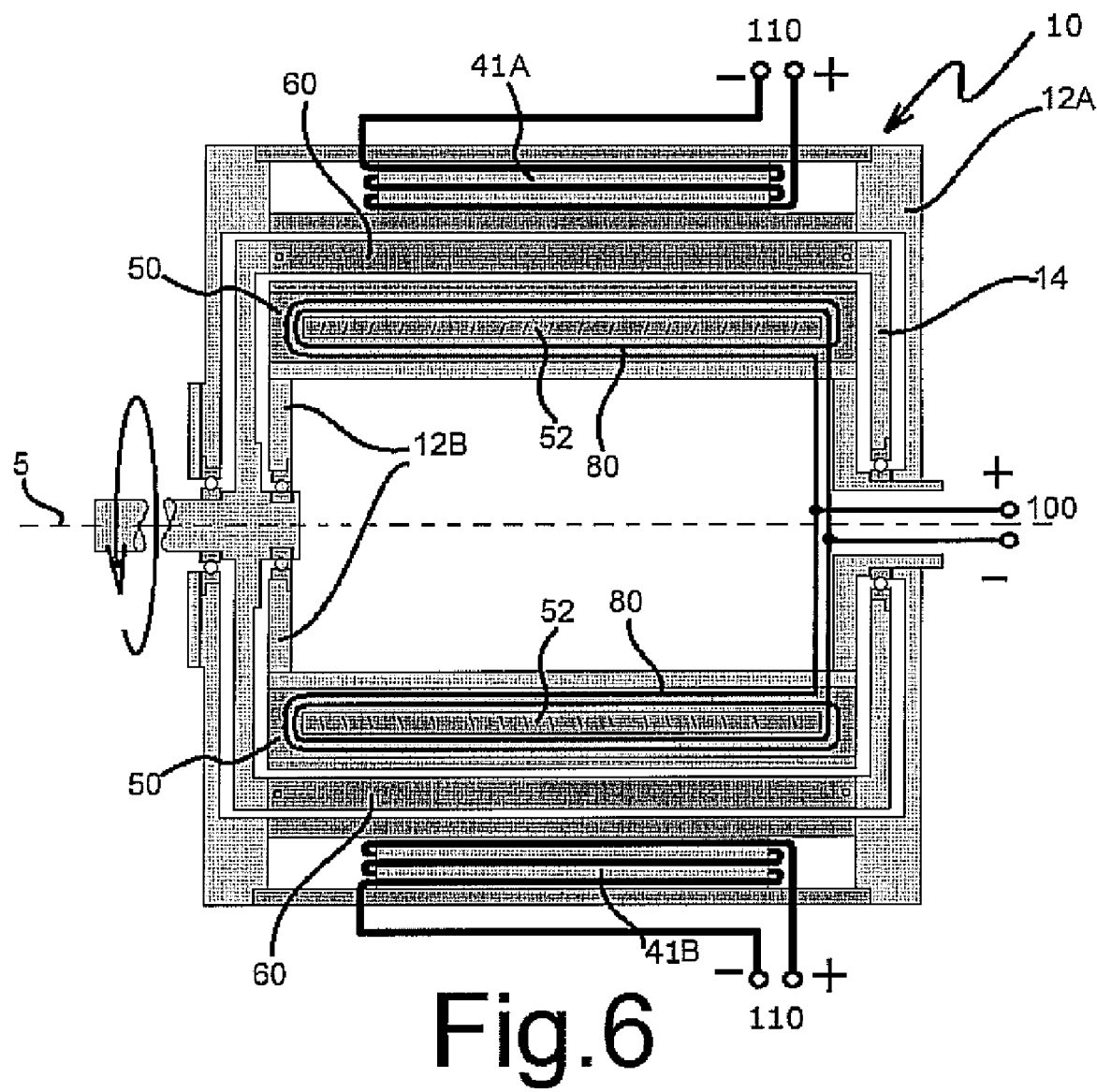
FIG. 6 is a the side view of FIG. 5 showing how electromagnets may be substituted for permanent magnets.

The motor-generator apparatus described above may also be described as a stator 12 and a rotor 14 in a cylindrical arrangement about a central longitudinal axis 5 where the stator 12 has a static circular magnetic surface 12S (FIG. 5) spaced apart from, a static circular electromagnetic surface 50S, and the rotor 14 has a cylindrical arrangement of radially oriented laminations 60 positioned proximal to, and between the static circular magnetic 12S and the static circular electromagnetic 50S surfaces, the rotor 14 supported for rotation relative to the stator 12 by a structure 15.

A circular arrangement of electromagnets 50M are electrically interconnected, as shown in FIG. 1, for carrying an electrical current which energizes the circular electromagnetic surface 50S.

The static circular magnetic surface 12S presents a magnetic north pole face over one-half of the circular magnetic surface 12S and a magnetic south pole face over the other one-half of the circular magnetic surface 12S.

The static circular magnetic surface 12S may be directed toward the central longitudinal axis 5 as shown in FIG. 1, or it may be directed away from the axis 5 as shown in FIG. 3.

The static circular electromagnetic surface 50S may comprise a plurality of gapped-apart surface portions wherein one-half of said surface portions are oriented with north pole faces alternating with south pole faces, and the other one half of said surface portions are oriented with south pole faces alternating with north pole faces.

A number of embodiments have been described. Nevertheless, it will be understood that various modifications may be made without departing from the spirit and scope of this disclosure. Accordingly, other embodiments are within the scope of the following claims.

What is claimed is:

1. A motor-generator apparatus comprising:
    a stator and a rotor in a concentric cylindrical arrangement about a common central axis;
    the stator having a pair of magnets presenting a circular surface having a north magnetic pole over a first 180° of the circular surface and a south magnetic pole over a second 180° of the circular surface;
    the stator further having a cylindrical arrangement of radially oriented first electromagnets with coils of the first electromagnets interconnected in electrical series; and
    a rotor having a cylindrical arrangement of radially oriented, spaced apart, and mutually insulated, magnetically permeable laminations positioned proximal to, and between the circular surface of the magnets and the coils of the electromagnets.

2. The apparatus of claim 1 wherein the pair of magnets are permanent magnets.

3. The apparatus of claim 1 wherein the pair of magnets are second electromagnets.

4. The apparatus of claim 1 wherein the pair of magnets are exterior relative to the first electromagnets.

5. The apparatus of claim 1 wherein the pair of magnets are interior relative to the first electromagnets.

* * * * *